(12) United States Patent
Wilson et al.

(10) Patent No.: US 8,223,006 B2
(45) Date of Patent: Jul. 17, 2012

(54) VEHICLE TEMPERATURE WARNING SYSTEM

(75) Inventors: Matt J. Wilson, Canal Fulton, OH (US); Matthew VanMeter, Cuyahoga Falls, OH (US); Santo Padula, Medina, OH (US); Jesse W. Cervantez, Navarre, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 337 days.

(21) Appl. No.: 12/465,949

(22) Filed: May 14, 2009

(65) Prior Publication Data

US 2009/0284362 A1 Nov. 19, 2009

Related U.S. Application Data

(60) Provisional application No. 61/053,873, filed on May 16, 2008.

(51) Int. Cl.
*B60Q 1/00* (2006.01)
(52) U.S. Cl. ............................ 340/449; 301/5.1; 73/146
(58) Field of Classification Search .................. 340/438, 340/449; 301/5.1, 124, 126, 131, 5.305; 73/146
See application file for complete search history.

(56) References Cited

U.S. PATENT DOCUMENTS

| 3,231,317 | A | 1/1966 | Dudar |
| 3,645,479 | A | 2/1972 | Kostroun et al. |
| 5,959,365 | A * | 9/1999 | Mantini et al. ............... 307/10.1 |
| 6,892,778 | B2 * | 5/2005 | Hennig et al. ............... 152/415 |
| 6,982,778 | B2 * | 1/2006 | Park et al. ..................... 349/153 |
| 2008/0084289 | A1 | 4/2008 | White et al. |

FOREIGN PATENT DOCUMENTS

| EP | 0999113 A1 | 5/2000 |
| GB | 2124421 A | 2/1984 |
| WO | 2005027065 A2 | 3/2005 |
| WO | 2007109623 A2 | 9/2007 |

* cited by examiner

*Primary Examiner* — George Bugg
*Assistant Examiner* — Edny Labbees
(74) *Attorney, Agent, or Firm* — Krugliak, Wilkins, Griffiths & Dougherty Co., L.P.A.; David P. Dureska; Brent L. Moore (57) ABSTRACT

A temperature warning system for a vehicle includes a thermal plug disposed on the wheel end assembly of the vehicle. The thermal plug is in fluid communication with an air supply and with a flow sensor. The flow sensor is operatively connected to a warning light or indicator. Excessive heat in the axle spindle end and/or the wheel end assembly causes a fusible material in the thermal plug to melt allowing air to flow from the air supply through the thermal plug thus activating the flow sensor. The flow sensor in turn activates the warning light or indicator alerting the driver of the vehicle of a problem condition at the wheel end assembly and/or axle spindle.

17 Claims, 8 Drawing Sheets

VEHICLE TEMPERATURE WARNING SYSTEM

CROSS-REFERENCE TO RELATED APPLICATION

This application claims the benefit of U.S. Provisional Application No. 61/053,873, filed on May 16, 2008.

BACKGROUND OF THE INVENTION

1. Field of the Invention

The invention relates generally to the art of temperature warning systems for vehicles, and in particular to temperature warning systems for the non-drive axles of heavy-duty vehicles, such as tractor-trailers or semi-trailers, and straight trucks, which are capable of functioning during vehicle operation. More particularly, the invention relates to a vehicle temperature warning system which utilizes a thermal plug that includes a fusible material and which is located in or adjacent to the wheel end assembly of a heavy-duty vehicle. The thermal plug operates in conjunction with a pressurized air supply and a flow sensor to alert the driver of the vehicle of an undesirable temperature condition in the wheel end assembly and/or the axle spindle end during operation of the vehicle.

2. Description of Related Art

Reference herein is made to tractor-trailers and semi-trailers by way of example, with the understanding that such reference applies to other heavy-duty vehicles, such as straight trucks. All tractor-trailers include at least one trailer, and sometimes two or three trailers, all of which are pulled by a single tractor. Each trailer includes a frame, from which at least one axle is suspended. A wheel end assembly is rotatably mounted on each end of the axle. More specifically, each wheel end assembly includes bearing assemblies that are mounted on a respective axle spindle end and a wheel hub which in turn is mounted on the bearing assemblies. In this manner, the bearing assemblies enable the wheel hub to rotate about the axle spindle end. A wheel rim including a tire is, in turn, mounted on the wheel hub in a manner well known to those having skill in the art.

To facilitate smooth rotation of each wheel hub about its respective axle spindle end, the bearing assemblies typically include lubricant. A bearing assembly seal formed of a relatively flexible material, such as rubber, is disposed on the inboard end of the wheel hub to isolate the bearing assemblies in order to prevent contaminants from passing into the bearing assemblies, and to contain the lubricant within the bearing assemblies. Repeated excessive speed or excessive braking of the vehicle often generates a large amount of heat in components of the wheel end assembly and/or the axle spindle end, in turn heating the bearing assembly lubricant and/or the bearing assembly seal, which may cause degradation of the lubricant and/or the seal. If the lubricant degrades, rotation of the wheel hub about the axle spindle end may become impaired and can result in damage to or failure of the wheel end assembly and/or the axle spindle end.

Alternatively, if the seal degrades, the lubricant may escape, or external contaminants may pass into the bearing assemblies, which can impair the rotation of the wheel hub about the axle spindle end and may potentially damage the wheel end assembly and/or the axle spindle end. It is this impaired rotation of the wheel end assembly about the axle spindle end that produces excessive heat in the wheel end assembly and in the axle spindle end. Similar potential damage may be caused by installation problems which can detrimentally affect the lubricant and/or bearing assemblies, and thus allow excessive heat to be generated in the wheel end assembly components and/or the axle spindle end. Such installation problems include situations in which the lubricant accidentally may have been omitted from the bearing assemblies, and/or over-tightening of the bearing assembly retaining nuts, which can overload the bearing assemblies. Moreover, absent the problem conditions set forth above, it is well documented and known to those having ordinary skill in the art that the bearing assemblies themselves typically exhibit excessive heat prior to failure.

In addition, in some applications, sealed bearing assemblies are used. Sealed bearing assemblies are self-contained units that are packed with lubricant and include a seal that is built into the bearing assembly. Such sealed bearing assemblies are known in the art as being non-serviceable, and thus typically cannot readily be opened in order to replace or add lubricant if the lubricant escapes the assembly or degrades. Rather, sealed bearing assemblies are typically removed from service and replaced if such a problem does occur. Since it is desirable to remove a sealed bearing assembly from service in the event that such a problem does occur, it is advantageous to attempt to monitor conditions that may indicate a potential problem, such as the generation of excessive heat, as described above.

Because multiple trailers, each possibly having multiple axles and multiple wheel end assemblies, may be pulled by a single tractor, the chance that a given wheel end assembly and/or axle spindle end may become impaired from the above-described conditions without detection by the vehicle operator increases. Because the potential damage resulting from such impairment is undesirable, it is advantageous to attempt to monitor the components of the axle, including the axle spindle ends and/or the wheel end assemblies, for high-temperature conditions. Such conditions may indicate degradation of or a lack of the proper amount of lubricant in the bearing assemblies, degradation of the bearing assembly seals, contamination in the bearing assemblies, an overloading of the bearing assemblies, or the breakdown of the bearing assembly itself. It is also advantageous to alert the operator to remove the vehicle from service to reduce the potential damage that may result from such conditions.

Prior art approaches to monitor conditions at the wheel end assembly typically utilize a programmable microprocessor to control the monitoring system. These approaches typically include a monitoring device for detecting problem conditions at the wheel end assemblies, which device typically includes a sensor located on the axle within the wheel hub, a microprocessor for receiving and processing the signals from the sensor to detect a problem condition at the wheel end assembly, and an indicator means to alert the driver of the problem condition. More particularly, the microprocessor interprets incoming data signals from the sensor disposed on the axle within the wheel hub and executes a pre-programmed decision-making process to determine when an alarm should be activated. These systems typically require complex wiring systems that make them costly to manufacture and difficult to install on the vehicle. Moreover, these systems also include thermal sensors which are relatively fragile and which are located within the axle spindle end of the axle which makes them difficult to replace when they become damaged or simply wear out due to normal wear and tear on the system.

Still other prior art temperature warning systems have incorporated wireless systems utilizing radio frequency transmitters and receivers in order to eliminate the need for the heretofore noted complex wiring systems. However, these systems also have demonstrated potential problems in that interference between the transmitter and the receiver can cause false indications of a problem condition when no problem condition actually exists.

Still other prior art temperature warning systems have included sensors which utilize fusible materials for sensing excessive heat conditions. However, those systems have located the fusible material within the axle spindle end which, when activated by exposure to an excessive heat condition, can release contaminants, i.e., the melted fusible material, into the wheel end assembly, and/or cause pressure to build in the wheel end assembly which can potentially cause the bearing assembly seal to leak, which in turn can potentially cause premature failure of the bearing assemblies.

Thus, a need exists in the art for a vehicle temperature warning system that: eliminates the need for relatively fragile thermal sensors which can potentially become damaged or wear out; which is better able to detect excessive heat in the axle spindle end and/or the wheel end assembly because of its position adjacent the bearing assemblies; which avoids contamination and pressure build-up in the wheel end assembly; and which is easily accessible for both replacement and/or maintenance of the system, yet still remains simple, reliable and cost efficient as compared to prior art temperature warning systems.

BRIEF SUMMARY OF THE INVENTION

The objectives of the present invention include providing a vehicle temperature warning system which eliminates relatively fragile thermal sensors that are potentially susceptible to damage and/or premature wear.

Another objective of the present invention is to provide a vehicle temperature warning system that improves detection of excessive heat in the axle spindle end and/or the wheel end assembly due to placement of the detection means adjacent the bearing assemblies.

A further objective of the present invention is to provide a vehicle temperature warning system that avoids contamination and pressure build-up in the wheel end assembly.

Yet another objective of the present invention is to provide a vehicle temperature warning system that is easily accessible for both replacement and/or maintenance of the system.

Still a further objective of the present invention is to provide a vehicle temperature warning system that is simple, reliable and cost efficient as compared to prior art vehicle temperature warning systems.

These objectives and improvements are provided by the temperature warning system for a vehicle, said vehicle including a wheel end assembly which is rotatably mounted on an axle spindle end of the vehicle, the vehicle temperature warning system of the present invention includes: an air supply; a thermal plug having a non-activated and an activated state, the thermal plug being disposed on the wheel end assembly in the non-activated state, the thermal plug being in fluid communication with the air supply and blocking fluid flow through the thermal plug from the air supply when the thermal plug is in the non-activated state; and a flow sensor operatively connected to a warning device, the flow sensor being in fluid communication with the thermal plug and with the air supply, whereby when the axle spindle end or the wheel end assembly become excessively heated during operation of the vehicle, the thermal plug is activated and allows fluid to flow from the air supply through the thermal plug, the fluid flow being sensed by the flow sensor which in turn activates the warning device.

These objectives and improvements are also provided by the temperature warning system for a vehicle, the vehicle including a wheel end assembly rotatably mounted on an axle spindle end of the vehicle, the vehicle temperature warning system including: an air supply; and a thermal plug having a non-activated state and an activated state, the thermal plug being disposed on the wheel end assembly in the non-activated state, the thermal plug being in fluid communication with said air supply and blocking fluid flow through the thermal plug from the air supply when the thermal plug is in the non-activated state, whereby when the axle spindle end or the wheel end assembly become excessively heated during operation of the vehicle, the thermal plug is activated and allows fluid to flow from the air supply through an opening formed in the wheel end assembly, the opening being shaped to produce and audible whistle as fluid passes through the opening.

BRIEF DESCRIPTION OF THE SEVERAL VIEWS OF THE DRAWINGS

Exemplary embodiments of the present invention, illustrative of the best modes in which applicants have contemplated applying the principles, are set forth in the following description and are shown in the drawings.

Similar numerals refer to similar parts throughout the drawings.

DETAILED DESCRIPTION OF THE INVENTION

Figure 1:
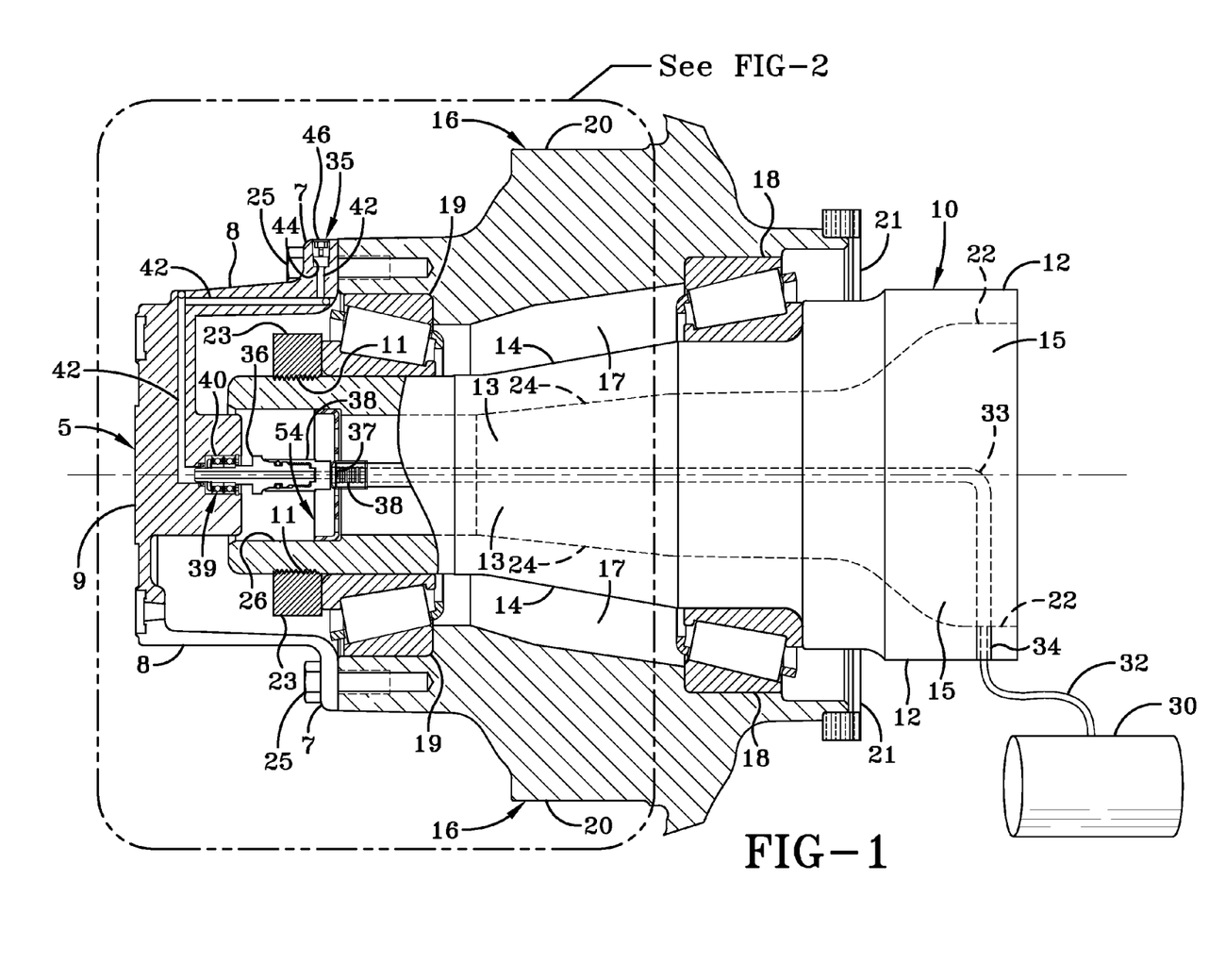
FIG. 1 is a fragmentary sectional elevational view with portions in section and hidden parts represented by dashed lines of the preferred embodiment temperature warning system of the present invention mounted on a typical wheel end assembly of a heavy-duty tractor-trailer axle, showing the air supply, axle conduit, rotary union, hub conduit, thermal plug.

Turning now to FIG. 1, a preferred embodiment vehicle temperature warning system 35 of the present invention is shown in conjunction with a portion of a typical axle 10 and a wheel end assembly 16. In order to better understand the environment in which vehicle temperature warning system 35 of the present invention is utilized, axle 10 and wheel end assembly 16 each now will be described.

Axle 10 includes an axle central tube 12 and a pair of axle spindle ends 14 (only one shown), each one of which is located on a respective one of a pair of outboard ends of the central tube. Wheel end assembly 16 includes inboard and outboard bearing assemblies 18 and 19, respectively, which are mounted on axle spindle end 14, and a wheel hub 20 that is mounted on the bearing assemblies in a well-known manner, thereby enabling the wheel hub to rotate about the axle spindle end. For the sake of clarity, only one axle spindle end 14 and wheel end assembly 16 will be described herein, though two are present on each axle 10, and a typical tractor-trailer (not shown) includes multiple axles. A bearing assembly seal 21 is mounted on the inboard end of wheel end assembly 16 adjacent inboard bearing assembly 18, for sealing the wheel end assembly and keeping the lubricant (not shown) contained within bearing assemblies 18,19 intact, and also for preventing contaminants from passing into the bearing assemblies. A spindle nut 23 having interior threads 11 is threaded onto spindle end 14 adjacent outboard bearing assembly 19 and secures the bearing assemblies onto the spindle end.

Figure 3:
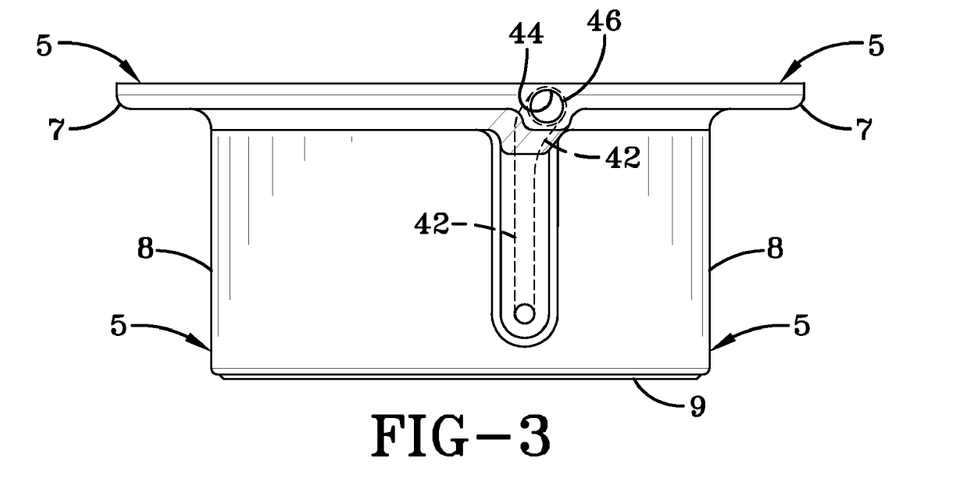
FIG. 3 is an elevational view of the hub cap shown in FIG. 1, showing the hub conduit located in the sidewall and flange of the hub cap, with hidden portions thereof represented by dashed lines.
Figure 4:
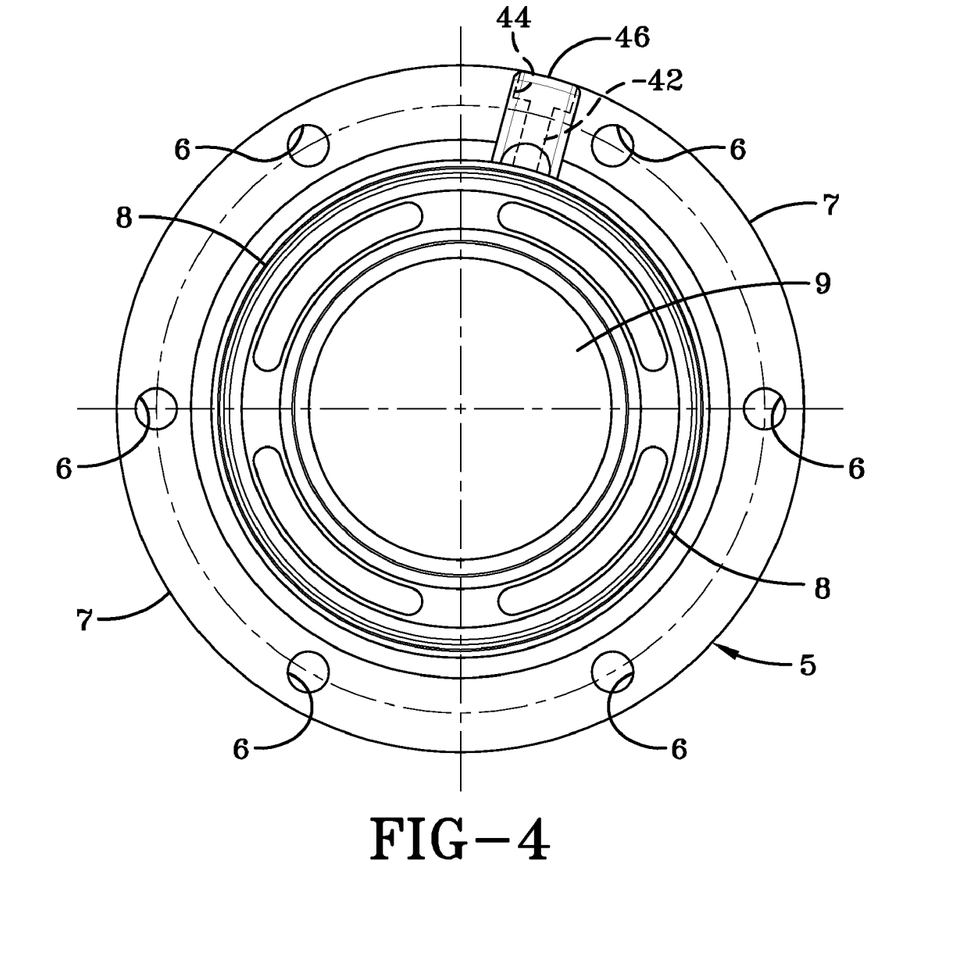
FIG. 4 is a top view of the hub cap shown in FIG. 3, showing the hub conduit formed through the flange, with hidden portions represented by dashed lines.

It should be noted that a hub cavity 17 exists between inboard bearing assembly 18 and outboard bearing assembly 19, and typically also contains lubricant. Moreover, depending on the application, lubricant may further be contained within a hub cap 5 that is mounted on the outboard end of wheel hub 20 and is part of wheel end assembly 16, as described in detail below. As best shown in FIGS. 3 and 4, hub cap 5 is integrally formed, and is generally cup-shaped having an outboard disk or wall 9 and a cylindrical sidewall 8. A flange 7 extends radially outwardly from the inboard end of sidewall 8 and is formed with a plurality of openings 6 which extend through the flange perpendicular to the inboard face of the flange (FIG. 4). A plurality of bolts 25 (only two shown, FIGS. 1 and 2) are disposed through openings 6 in order to attach hub cap 5 to wheel hub 20. For the purposes of convenience, reference herein will be made to the lubricant in bearing assemblies 18,19 and hub cavity 17, with the understanding that such reference also includes lubricant in hub cap 5.

It is important to note that, with continuing reference to FIG. 1, axle 10 is of a hollow type and includes an inner diameter 22 which defines a hollow cavity 15 in axle central tube 12. Axle spindle end 14 also includes an inner diameter 24 and a hollow cavity 13 that correspond to inner diameter 22 and hollow cavity 15 of axle central tube 12. Axle central tube inner diameter 22 tapers to smaller variable diameter 24 at axle spindle end 14. Alternatively, axle spindle inner diameter 24 may be straight, rather than tapered. A counterbore 26 is formed in the outboard end of axle spindle end 14 about axle spindle inner diameter 24 and extends into the axle spindle end a short distance, such as from about 0.5 inches to about 2 inches. Since counterbore 26 is machined after axle spindle end 14 is formed, the counterbore typically is of a narrower geometric tolerance than the remainder of axle spindle inner diameter 24.

As described above, certain driving conditions or installation problems of wheel end assembly 16 may be the cause of excessive heat generation in axle spindle end 14 and/or the wheel end assembly, which can lead to degradation of the lubricant in bearing assemblies 18,19 and hub cavity 17, or the breaking down of bearing assembly seal 21, allowing the lubricant to leak out of, and/or contaminants to enter into, one or both of the bearing assemblies. In addition, other problems may lead to inadequate lubrication of bearing assemblies 18,19 or undue load on the bearing assemblies, all of which can cause the generation of excessive heat, which in turn may damage axle spindle end 14 and/or wheel end assembly 16 during vehicle operation. The temperature warning system of the present invention is capable of detecting and indicating generation of such undesirable heat, alerting the driver of the tractor-trailer of the excessive heat condition, and thereby reducing or eliminating the possibility of damage caused by continued operation in such a state.

With continuing reference to FIGS. 1-4, preferred embodiment temperature warning system of the present invention is indicated generally at 35, and is shown incorporated into axle 10. Warning system 35 includes an air supply 30, which is typical for a heavy-duty vehicle and is used to supply various components of the vehicle such as brakes (not shown) and/or a tire inflation system (not shown). Preferably, air supply 30 is in fluid communication with an axle conduit 33 via a supply conduit 32 connected to an axle plug 34 that is disposed through the wall of axle central tube 12 and which is in fluid communication with the axle conduit. A spindle plug 54 includes a lip 58 (FIG. 2) that engages the wall of machined counterbore 26 in axle spindle end 14 in a secure press-fit.

Figure 2:
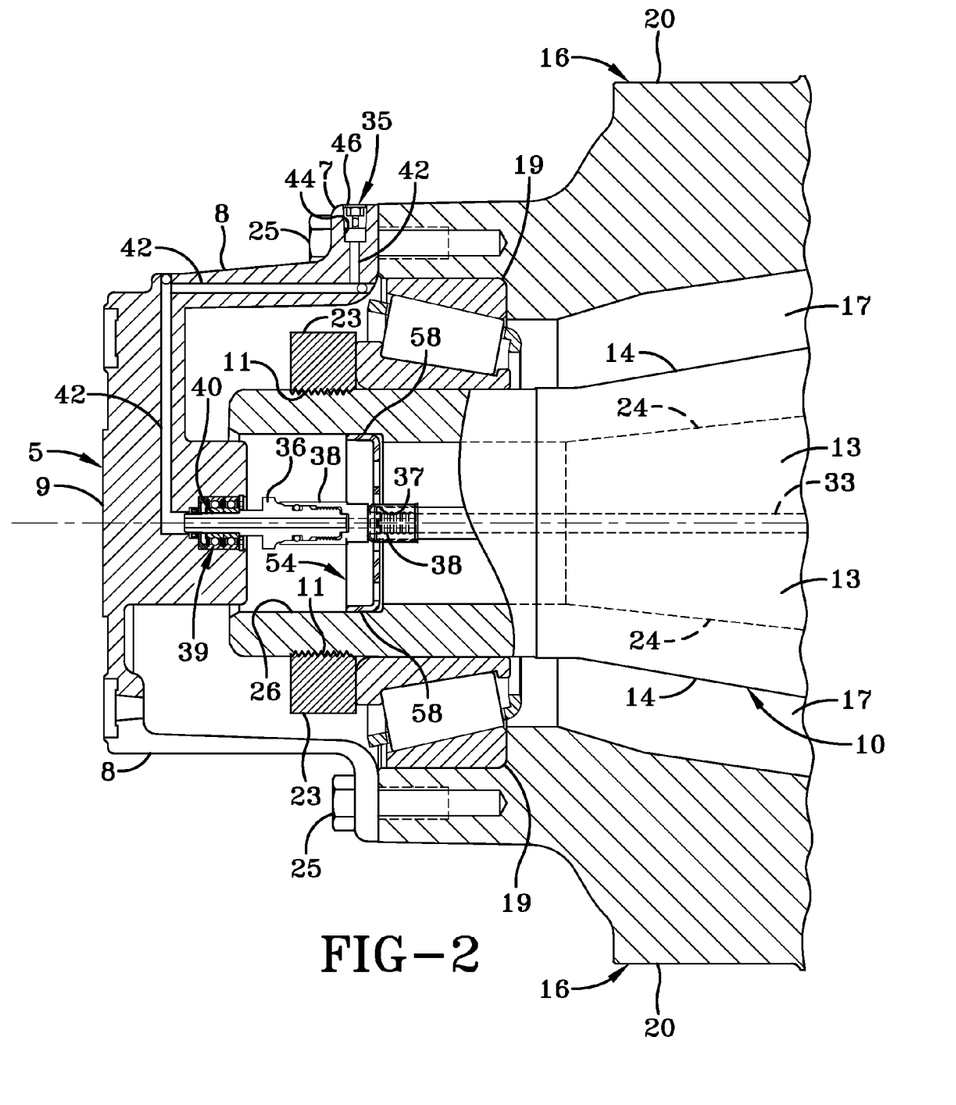
FIG. 2 is a greatly enlarged view similar to FIG. 1, showing the hub conduit in fluid communication with the axle conduit via the rotary union and also with the thermal plug.

With continued reference to FIGS. 1 and 2, an axle hose fitting 38 is disposed through an opening 37 formed through spindle plug 54. Axle hose fitting 38 is in fluid communication with axle conduit 33. A rotary union 39 includes a stem 36 which is threadably connected to axle hose fitting 38 and is in fluid communication with the axle hose fitting. Rotary union 39 is disposed within a recess 40 formed in hub cap 5. With additional reference to FIGS. 3 and 4, a hub conduit 42 is formed in hub cap 5 and provides fluid communication between rotary union 39 and a hub flange opening 44 to atmosphere.

In accordance with one of the primary features of the present invention, a thermal plug 46 having an activated and a non-activated state and containing a fusible material is disposed in hub flange opening 44. More particularly, thermal plug 46 includes a fusible material preferably having a melting point which is in the range of temperatures which are generated in hub caps when a problem condition exists in wheel end assembly 16 and/or axle spindle end 14, such as degradation of or a lack of the proper amount of lubricant in bearing assemblies 18, 19, degradation of bearing assembly seal 21, contamination in the bearing assembly, an overloading of the bearing assembly, or the breakdown of the bearing assembly itself. Such conditions are well known to those with ordinary skill in the art. In the non-activated state, thermal plug 46 blocks the flow of fluid through the thermal plug. When the fusible material in thermal plug 46 reaches its melting point temperature, the fusible material melts and the thermal plug becomes activated allowing air to flow from air supply 30, through supply conduit 32, through axle conduit 33, through axle hose fitting 38, through rotary union 39, through hub conduit 42, and through the thermal plug to atmosphere. Thus, by selecting a fusible material for thermal plug 46 having a specific melting point, warning system 35 can be adapted to sense a range of temperatures dependant upon the melting point of the fusible material and the application in which the warning system is being utilized.

A flow sensor (not shown) is in fluid communication with hub conduit 42 via a tire inflation system conduit (not shown). More particularly, the flow sensor is incorporated into a tire inflation system (not shown), such as the TIREMAAX® tire inflation system which is marketed and sold by the assignee of the present invention. The flow sensor is electrically connected to a warning light (not shown) located on the trailer (not shown) of the vehicle. The flow sensor is capable of sensing air flow through hub conduit 42, which would occur when the fusible material in thermal plug 46 has melted due to excessive heat, and in turn activates the warning light when such air flow is detected by the flow sensor, alerting the operator of the vehicle that a dangerous temperature condition exists at axle spindle end 14 and/or wheel end assembly 16.

Figure 4A:
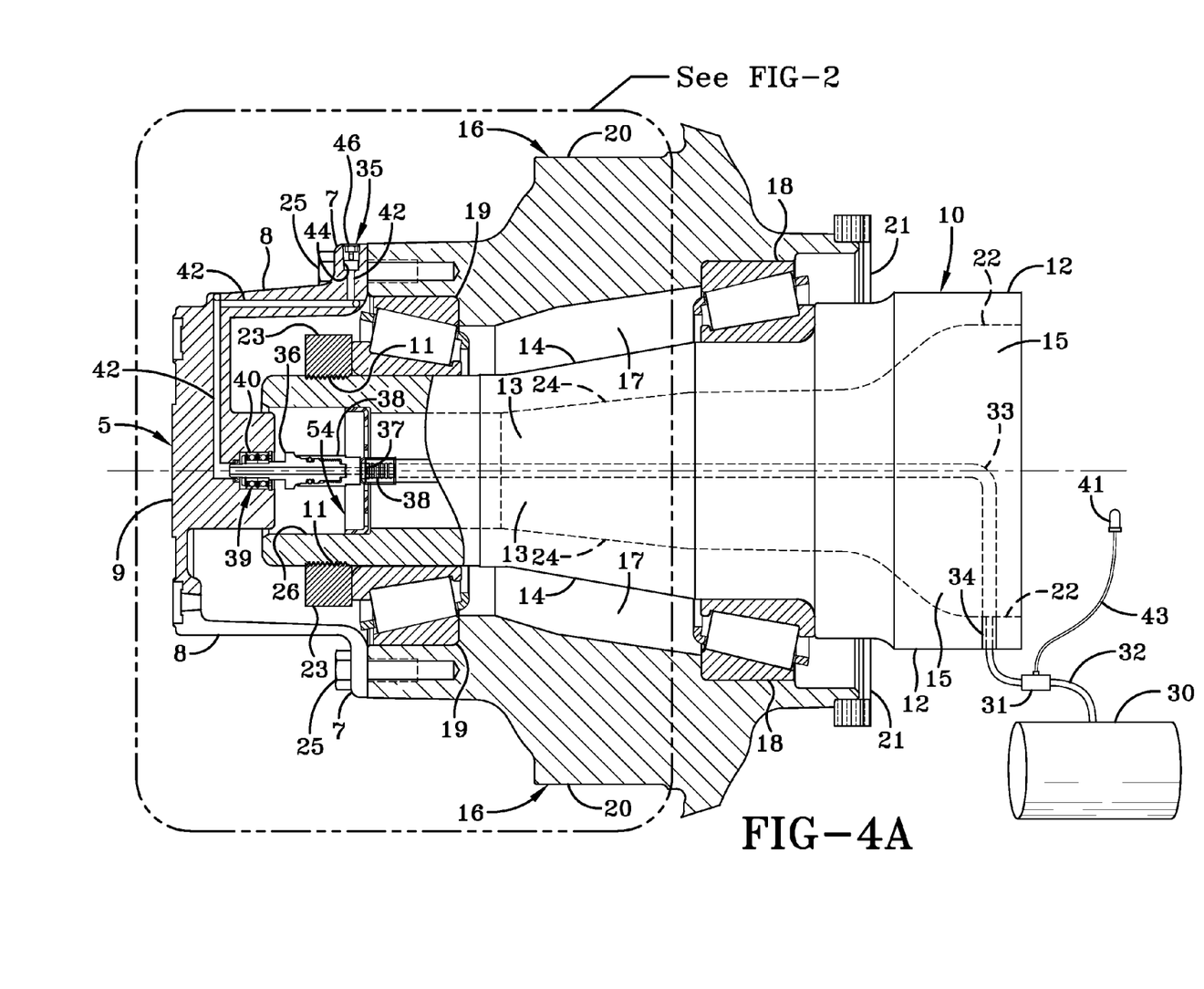
FIG. 4A is a view similar to FIG. 1, showing schematically the flow sensor connected to the warning light.

It should be understood that preferred embodiment temperature warning system 35 of the present invention is described operating in conjunction with a tire inflation system, as set forth above, however, the warning system can also be utilized without a tire inflation system. In such a configuration and as best shown in FIG. 4A, a flow sensor 31 is electrically connected to a warning light or indicator 41 via an electrical cable 43, and the flow sensor is in fluid communication with supply conduit 32, axle conduit 33, and hub conduit 42, such that the flow sensor is capable of sensing air flow when the fusible material in thermal plug 46 is melted and air is allowed to flow from air supply 30, through the supply conduit, through the axle conduit, through axle hose fitting 38, through rotary union 39, through the hub conduit, and through the thermal plug to atmosphere.

It is important to note that, because the minimum temperature at which thermal plug 46 activates may be relatively low in view of some operating conditions, temperature increases caused by relatively temporary conditions, such as excess speed or braking on a long grade, could increase the temperature of the thermal plug enough to melt the selected fusible material within the plug, thus allowing air flow through the plug to atmosphere, and thus activating warning light 41. Preferably, thermal plug 46 includes a fusible material having a melting point which is at as high a temperature as reasonably possible to indicate an excessive heat condition in axle spindle end 14 and/or wheel assembly 16, thereby minimizing situations in which warning system 35 is inadvertently triggered for such temporarily-demanding operating conditions. Of course, repeated conditions such as excessive speed and excessive braking can break down the bearing assembly lubricant, as noted above, which may create a high-temperature situation that is not attributable to a temporarily-demanding operating condition, in which case warning system 35 activates warning light 41 as contemplated by the present invention.

It should also be noted, as set forth above, that various conditions that may cause the lubricant in bearing assemblies 18,19 and/or hub cavity 17 to degrade will cause the fusible material within thermal plug 46 to melt thus activating warning system 35, such as: an excessive preload of the bearing assemblies; a loss of lubrication in the bearing assemblies; contamination of the lubricant due to degradation of bearing assembly seal 21; increased friction in the bearing assemblies because of rapid degradation of lubricant; and break down of the bearing assembly itself. In these circumstances, the temperature at axle spindle end 14 will increase and cause the fusible material within thermal plug 46 located on hub 5 to melt, thus activating warning system 35 and thereby alerting the vehicle operator that an undesirable condition exists.

With continued reference to FIG. 1, the operation of warning system 35 of the present invention now will be described. When a problem condition, such as excessive heat within axle spindle end 14 and/or wheel end assembly 16 exists, the fusible material contained within thermal plug 46 melts, allowing pressurized air from air supply 30 to flow through supply conduit 32, through axle conduit 33, through axle hose fitting 38, through rotary union 39, through hub conduit 42 and through the thermal plug to atmosphere. Flow sensor 31, which is in fluid communication with hub conduit 42, as set forth above, senses the flow of air through hub conduit 42 and activates warning light 41 to alert the operator of the vehicle to the problem condition. Therefore, it can be seen that warning system 35 of the present invention alerts a driver of a problem condition in axle spindle end 14 and/or in its associated wheel end assembly 16, while the vehicle is moving; there is no need for the driver to stop the vehicle to check a mechanical indicator on the hub, as in certain other systems of the prior art. Moreover, because thermal plug 46 is conveniently located on flange 7 of hub cap 5, its location is optimal for detecting excessive heat in both axle spindle end 14 and wheel end assembly 16 as well as allowing for greater accessibility including easy repair and replacement of the thermal plug during routine maintenance of the vehicle. This location also avoids air pressure build up within wheel end assembly 16 because the air is released through thermal plug 46 directly to atmosphere outside of the wheel end assembly. In addition, because thermal plug 46 utilizes the inherent properties of the fusible material in order to indicate a high temperature condition, it eliminates the need for the relatively fragile thermal sensors associated with the prior art. Moreover, because thermal plug 46 is located on hub 5, outside of the operating environment of bearing assemblies 18,19, the melted fusible material cannot contaminate the bearing assemblies as is typical in prior art warning systems which use fusible material that is located within the operating environment of the bearing assemblies.

In this manner, vehicle warning system 35 of the present invention overcomes the problems associated with prior art systems through use of thermal plug 46 which is conveniently located on flange 7 of hub cap 5 of the vehicle and which provides a simple, efficient and dependable system, leading to distinct manufacturing, repair, and installation cost advantages. Warning system 35 of the present invention provides an apparatus for more reliable and convenient monitoring of certain undesirable temperature conditions in axle spindle end 14 and/or wheel end assembly 16 over systems of the prior art, and provides a warning system that is easier to install or retrofit onto a tractor-trailer, and which is less expensive and easier to maintain than the prior art warning systems.

It is contemplated that different types of thermal plugs containing fusible material with different melting points could be selected for use with warning system 35 without changing the overall concept of the present invention. Moreover, it is also contemplated that thermal plug 46 could be positioned and/or mounted at different locations on or adjacent hub cap 5 while still maintaining fluid communication with hub conduit 42, such as being positioned on sidewall 8 of the hub cap, being positioned on the brake rotor assembly, being positioned on wheel hub 20, being positioned or adapted to fit on a blind wheel flange or wheel adapter 60 as shown in FIGS. 5 and 5A, or being positioned or adapted to fit on a cap-style wheel flange or wheel adapter 62 as shown in FIGS. 6, 6A, and 6B, without changing the overall concept of the present invention.

Figure 5:
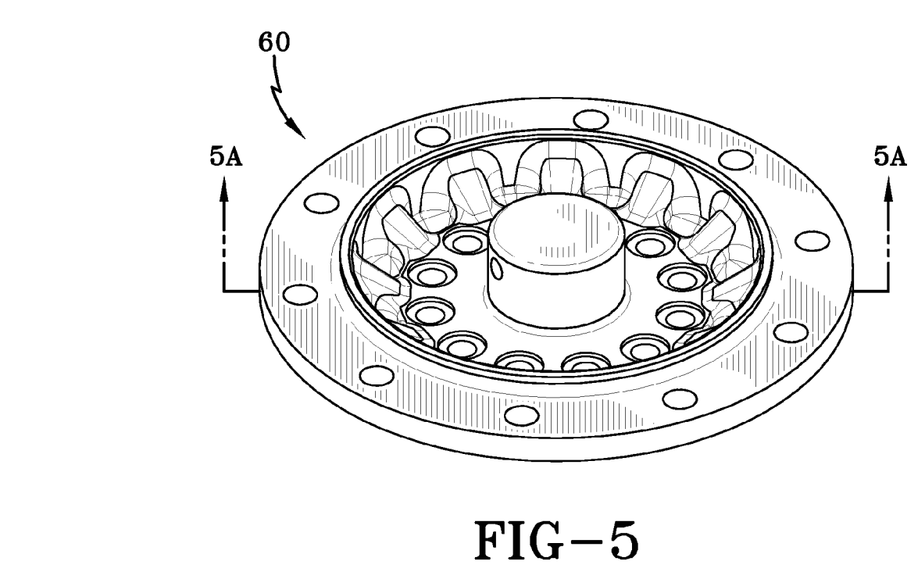
FIG. 5 is a top perspective view of a blind wheel flange incorporating the temperature warning system of the present invention.
Figure 5A:
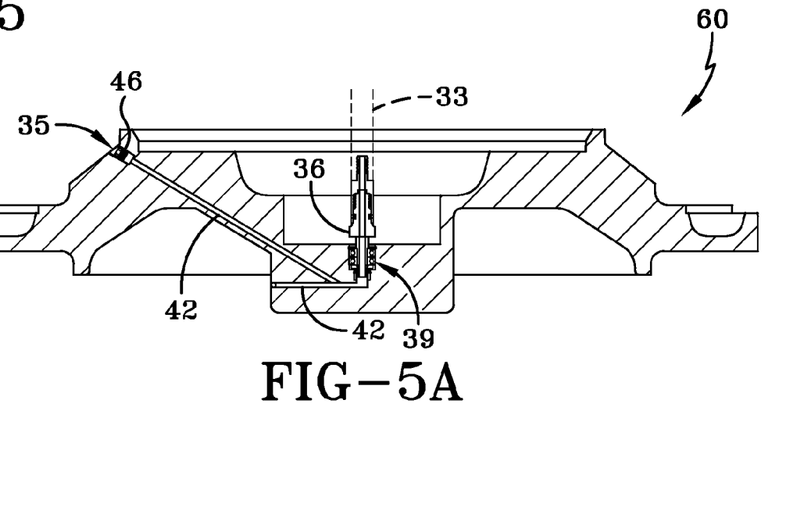
FIG. 5A is a sectional view taken along lines 5A-5A of FIG. 5, showing the hub conduit in fluid communication with the thermal plug and the rotary union.

More particularly, with reference to FIGS. 5 and 5A, warning system 35 of the present invention is shown incorporated into blind wheel flange 60 which includes thermal plug 46 mounted on the inboard side of the blind wheel flange. Thermal plug 46 is in fluid communication with hub conduit 42 which in turn is in fluid communication with rotary union 39. Rotary union 39 includes stem 36 which is in fluid communication with axle conduit 33, supply conduit 32, and air supply 30 as set forth above and as shown in FIG. 4A. When a problem condition exists in axle spindle end 14 and/or wheel end assembly 16 and when the fusible material in thermal plug 46 reaches its melting point, the fusible material melts allowing air to pass from air supply 30 to rotary union 39 as described above, through hub conduit 42, and through the thermal plug to atmosphere. The air flow is sensed by flow sensor 31 (FIG. 4A) which in turn activates warning light 41 alerting the operator of the vehicle of the problem condition in axle spindle end 14 and/or wheel end assembly 16.

Figure 6:
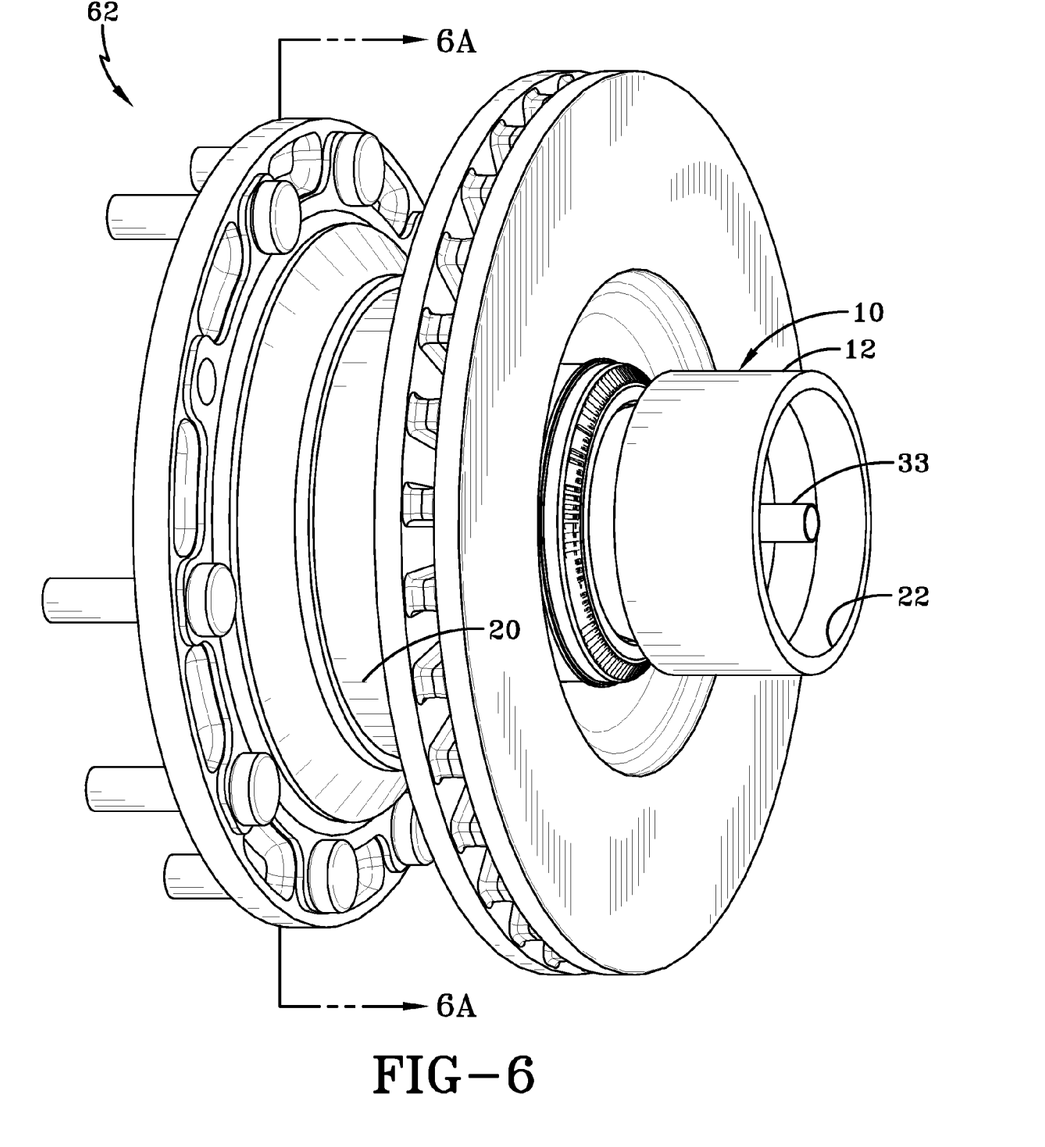
FIG. 6 is a perspective view of a cap-style wheel flange incorporating the temperature warning system of the present invention.
Figure 6A:
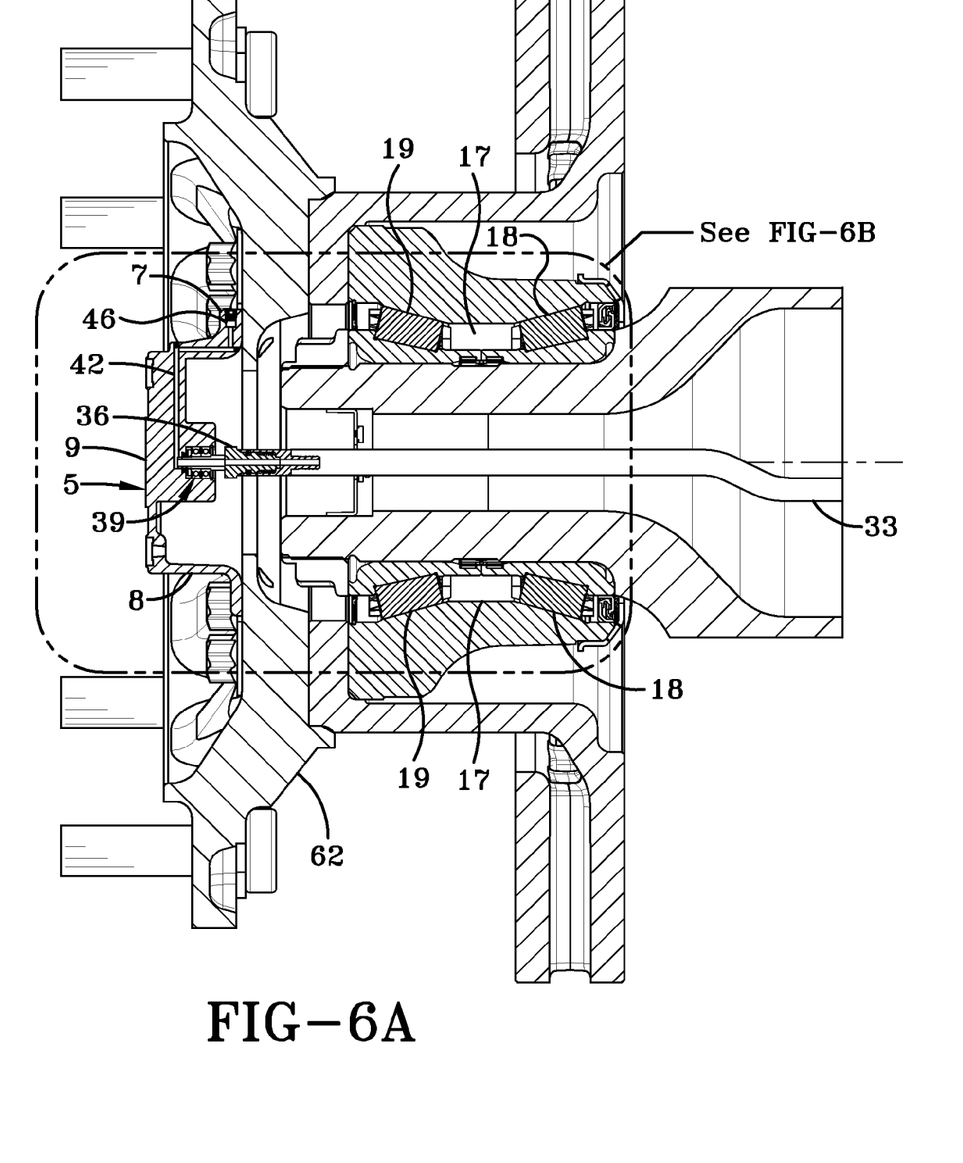
FIG. 6A is a sectional view taken along lines 6A-6A of FIG. 6, showing the hub conduit in fluid communication with the axle conduit, the rotary union and the thermal plug.
Figure 6B:
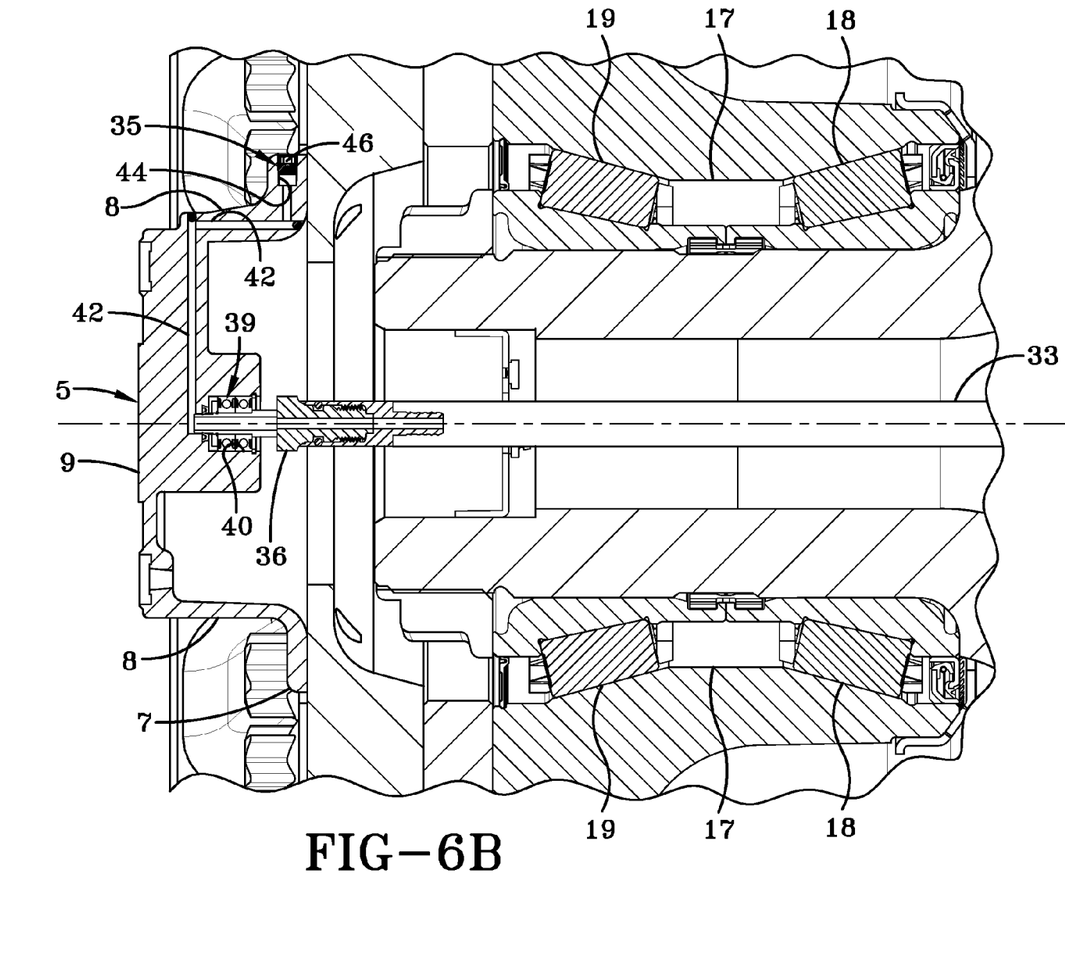
FIG. 6B is a greatly enlarged view of the portion of FIG. 6A outlined by dot-dash lines, showing the hub conduit in fluid communication with the thermal plug, the rotary union, and the axle conduit.

Turning to FIGS. 6, 6A, and 6B, warning system 35 of the present invention is shown incorporated into cap-style wheel flange 62 which includes thermal plug 46 mounted on flange 7 of hub cap 5, as generally otherwise set forth above. Thermal plug 46 is in fluid communication with hub conduit 42 which in turn is in fluid communication with rotary union 39. Rotary union 39 includes stem 36 which is in fluid communication with axle conduit 33, supply conduit 32, and air supply 30 as set forth above and as shown in FIG. 4A. When a problem condition exists in axle spindle end 14 and/or wheel end assembly 16 and when the fusible material in thermal plug 46 reaches its melting point, the fusible material melts allowing air to pass from air supply 30 to rotary union 39 as described above, through hub conduit 42, and through the thermal plug to atmosphere. The air flow is sensed by flow sensor 31 which in turn activates warning light 41 alerting the operator of the vehicle of the problem condition in axle spindle end 14 and/or wheel end assembly 16.

It is even further contemplated that warning system 35 of the present invention could be utilized with more than one thermal plug 46, such as with multiple thermal plugs in fluid communication with hub conduit 42, without changing the overall concept of the present invention. Furthermore, warning system 35 could be used on vehicles with only one axle 10 or multiple axles. It is also contemplated that warning light 41 could be replaced by an audible signal or other such alarm or indicator, such as a siren, buzzer, or scrolling ticker, without affecting the overall concept of the invention. It is yet even further contemplated that the hub flange opening could be of a shape that would produce a whistle or other audible sound as the air flow passes through the opening. It is even further contemplated that temperature warning system 35 of the present invention could be utilized either in conjunction with a tire inflation system or without a tire inflation system, as set forth above, without changing the overall concept of the present invention. It is yet even further contemplated that temperature warning system 35 of the present invention could be used with a wireless radio frequency transmitter which would connect the flow sensor to the warning light, without changing the overall concept of the invention. It is even further contemplated that temperature warning system 35 of the present invention could be utilized with different types of axles and wheel end assemblies other than those shown or described herein, such as a solid axle or solid axle spindle, each including a bore to accommodate the components of the temperature warning system, and/or axles having different cross-sectional shapes, such as rectangular or square, without changing the overall concept of the present invention. It is also contemplated that temperature warning system 35 of the present invention could be utilized without rotary union 39, whereby hub cap 5 is pressurized with air from axle conduit 33 disposed through an opening in spindle plug 54, without changing the overall concept of the present invention. It is even further contemplated that temperature warning system 35 of the present invention could be utilized without axle conduit 33, whereby hollow cavities 15,13 of axle 10 are pressurized with air supplied from air supply 30 via supply conduit 32 and axle plug 34 in order to pressurize the axle and supply air to rotary union 39, without changing the overall concept of the present invention. It is yet even further contemplated that thermal plug 46 could be located at several different locations on wheel end assembly 16 or on components attached thereto without changing the overall concept of the present invention.

The present invention has been described with reference to a specific embodiment. It is to be understood that this illustration is by way of example and not by way of limitation. Potential modifications and alterations will occur to others upon a reading and understanding of this disclosure, and it is understood that the invention includes all such modifications and alterations and equivalents thereof.

Accordingly, the vehicle temperature warning system of the present invention is simplified, provides an effective, safe, inexpensive, and efficient vehicle temperature warning system which achieves all the enumerated objectives, provides for eliminating difficulties encountered with prior art vehicle temperature warning systems, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the vehicle temperature warning system is constructed, arranged and used, the characteristics of the construction and arrangement, and the advantageous, new and useful results obtained; the new and useful structures, devices, elements, arrangements, parts and combinations, and methods are set forth in the appended claims.

What is claimed is:

1. A temperature warning system for a vehicle, said vehicle including a wheel end assembly rotatably mounted on an axle spindle end of the vehicle, said vehicle temperature warning system comprising:
    a) an air supply;
    b) a thermal plug having a non-activated state and an activated state, said thermal plug being disposed on said wheel end assembly in said non-activated state, said wheel end assembly including a bolt, said thermal plug being disposed adjacent said bolt, the thermal plug being in fluid communication with said air supply and blocking fluid flow through the thermal plug from said air supply when said thermal plug is in the non-activated state; and
    c) a flow sensor operatively connected to a warning device, said flow sensor being in fluid communication with said thermal plug and with said air supply, whereby when said axle spindle end or said wheel end assembly become excessively heated during operation of said vehicle, said thermal plug is activated and allows fluid to flow from said air supply through the thermal plug, said fluid flow being sensed by said flow sensor which in turn activates said warning device.

2. The vehicle temperature warning system of claim 1, wherein said wheel end assembly further comprises a cap-style wheel flange, said thermal plug being mounted on said cap-style wheel flange.

3. The vehicle temperature warning system of claim 1, wherein said wheel end assembly further comprises a blind wheel flange, said them al plug being mounted on said blind wheel flange.

4. The vehicle temperature warning system of claim 1, wherein said wheel end assembly further comprises a wheel hub and a hub cap, said thermal plug being mounted on said hub cap.

5. The vehicle temperature warning system of claim 1, wherein said wheel end assembly includes a brake rotor, said thermal plug being mounted on said brake rotor.

6. The vehicle temperature warning system of claim 4, said thermal plug being mounted on said wheel hub.

7. The vehicle temperature warning system of claim 1, said thermal plug further comprising a fusible material.

8. The vehicle temperature warning system of claim 1, wherein said wheel end assembly further comprises a wheel hub and a hub cap, a rotary union being mounted on said hub cap, said rotary union being in fluid communication with said thermal plug and with said air supply.

9. The vehicle temperature warning system of claim 1, said warning device being selected from the group consisting of a warning light, a siren, a buzzer, and a scrolling ticker.

10. A temperature warning system for a vehicle, said vehicle including a wheel end assembly rotatably mounted on an axle spindle end of the vehicle, said vehicle temperature warning system comprising:
   a) an air supply; and
   b) a thermal plug having a non-activated state and an activated state, said thermal plug being disposed on said wheel end assembly in said non-activated state, said wheel end assembly including a bolt, said thermal plug being disposed adjacent said bolt, the thermal plug being in fluid communication with said air supply and blocking fluid flow through the thermal plug from said air supply when said thermal plug is in the non-activated state, whereby when said axle spindle end or said wheel end assembly become excessively heated during operation of said vehicle, said thermal plug is activated and allows fluid to flow from said air supply through an opening formed in said wheel end assembly, said opening being shaped to produce an audible whistle as fluid passes through said opening.

11. The vehicle temperature warning system of claim 10, wherein said wheel end assembly further comprises a cap-style wheel flange, said thermal plug being mounted on said cap-style wheel flange.

12. The vehicle temperature warning system of claim 10, wherein said wheel end assembly further comprises a blind wheel flange, said thermal plug being mounted on said blind wheel flange.

13. The vehicle temperature warning system of claim 10, wherein said wheel end assembly further comprises a wheel hub and a hub cap, said thermal plug being mounted on said hub cap.

14. The vehicle temperature warning system of claim 10, wherein said wheel end assembly includes a brake rotor, said thermal plug being mounted on said brake rotor.

15. The vehicle temperature warning system of claim 13, said thermal plug being mounted on said wheel hub.

16. The vehicle temperature warning system of claim 10, said thermal plug further comprising a fusible material.

17. The vehicle temperature warning system of claim 10, wherein said wheel end assembly further comprises a wheel hub and a hub cap, a rotary union being mounted on said hub cap, said rotary union being in fluid communication with said thermal plug and with said air supply.

* * * * *

UNITED STATES PATENT AND TRADEMARK OFFICE
CERTIFICATE OF CORRECTION

| | |
|---|---|
| PATENT NO. | : 8,223,006 B2 |
| APPLICATION NO. | : 12/465949 |
| DATED | : July 17, 2012 |
| INVENTOR(S) | : Matt J. Wilson et al. |

It is certified that error appears in the above-identified patent and that said Letters Patent is hereby corrected as shown below:

Claim 3, Column 10, line 66, delete "them al" and replace with "thermal".

Signed and Sealed this
Eleventh Day of September, 2012

David J. Kappos
*Director of the United States Patent and Trademark Office*